United States Patent
Tremel et al.

(10) Patent No.: US 6,409,803 B1
(45) Date of Patent: Jun. 25, 2002

(54) AMALGAM SEPARATION

(75) Inventors: James D. Tremel, Casper, WY (US); Chenoa J. Jensen, Rapid City, SD (US); Garland P. Krabbenhoft, Fort Leonard Wood, MO (US); Daniel F. Dolan, Rapid City; Robert A. Meyer, Spearfish, both of SD (US)

(73) Assignee: RAMVAC Corporation, Spearfish, SD (US)

( * ) Notice: Subject to any disclaimer, the term of this patent is extended or adjusted under 35 U.S.C. 154(b) by 0 days.

(21) Appl. No.: 09/616,080

(22) Filed: Jul. 13, 2000

Related U.S. Application Data
(60) Provisional application No. 60/143,644, filed on Jul. 14, 1999.

(51) Int. Cl.[7] .............................................. B01D 45/12
(52) U.S. Cl. ........................ 95/271; 55/349; 55/421; 55/431; 55/459.1; 55/467; 433/92
(58) Field of Search .................... 55/345, 346, 349, 55/421, 459.1, 467, 431; 433/92; 95/271

(56) References Cited

U.S. PATENT DOCUMENTS

| | | | | |
|---|---|---|---|---|
| 3,543,931 A | * | 12/1970 | Rastatter | 55/349 |
| 3,771,290 A | * | 11/1973 | Stethem | 210/304 |
| 4,842,478 A | * | 6/1989 | Durr et al. | 433/92 |
| 5,330,641 A | * | 7/1994 | Cattani | 433/92 |

FOREIGN PATENT DOCUMENTS

DE         082247    *  6/1983

* cited by examiner

Primary Examiner—Robert A. Hopkins
(74) Attorney, Agent, or Firm—Nixon & Vanderhye P.C.

(57) ABSTRACT

Amalgam and other particles of four microns or more in size are removed with at least 95% efficiency from a particle-containing fluid line, preferably connected to a single dental operatory. Desirably a plurality of parallel centrifugal separators have their inlets connected to the fluid line, and gas outlets connected to a dental vacuum pump. The bottom liquid and particle outlet drains to a particle filter. The filtered water can be reintroduced into the gas flow to the vacuum pump, and the collected particles are disposed of in an environmentally sound manner.

19 Claims, 10 Drawing Sheets

AMALGAM SEPARATION

CROSS REFERENCE TO RELATED APPLICATION

This application is based upon U.S. provisional application Ser. No. 60/143,644 filed Jul. 14, 1999, the disclosure of which is hereby incorporated by reference herein.

BACKGROUND AND SUMMARY OF THE INVENTION

Environmental awareness and protection is becoming an ever more important topic in today's industrial society. While the impact of large quantity environmental polluters has long been realized and regulated, the regulation of smaller scale contributors is becoming increasingly fundamental. The dental arena is no exception to this rule, and is currently being targeted for its hazardous waste production.

A common dental procedure involves the reconstruction of decayed tooth cavities with amalgam, a metal alloy typically comprising approximately 50% mercury and 50% silver, copper, and nickel, collectively. During these routine restoration procedures, as well as amalgam restoration removals, amalgam particles become entrained in dental clinic waste streams. When introduced to the environment, the high concentration of mercury in the amalgam chemically reacts with living bacteria. Products of this methlyization reaction include monomethyl mercury and dimethyl mercury, which are both powerful neurotoxins. These toxic materials can be introduced to the ground water supply and eventually accumulate in the food chain.

As such, the amalgam particles must be removed from the waste streams and disposed of using appropriate hazardous waste procedures. While the United States, as a whole, does not currently regulate the release of amalgam from dental clinics, methods of management are being actively discussed. Many countries, however, have regulatory procedures in place; Germany for example, requires that all dental offices remove 95% of all amalgam particles from their waste.

In doing so, two separation techniques are currently being utilized for the capture of fugitive amalgam. Centrifuge separators and large sedimentation separators are the common filtration techniques in use. These are typically cumbersome, expensive, and maintenance intensive devices that are placed near the end of the waste system, after the refuse from all operating rooms combine into a common header. Another system for multiple operatories is shown in U.S. Pat. No. 5,017,135 (incorporated by reference herein).

According to the invention it is preferred to provide a device and method that efficiently accomplish the separation of amalgam, and related sludge, from the waste stream discharged from each individual operating room. Thus, the separator and separation procedure will satisfy the environment concerns related to the release of amalgam while protecting waste system piping from corrosion and particle build-up and ultimately from disposal concerns. The constraints imposed on this device require a small, inexpensive, and operator friendly device that cannot be accomplished with currently used separation techniques. The equipment can be made of any conventional suitable materials that are capable of withstanding the action of the waste stream flows.

The design specifications for amalgam separation according to the invention include separation efficiency, pressure loss, size, and energy constraints needed for an entirely effective device. Additionally, the operator interface and shipping and handling requirements related to separator design are taken into account, as well as compliance with all applicable laws and codes. These specifications are outlined in Table 1.

TABLE 1

| Design Objectives | |
|---|---|
| Separation | 95% of 5 micron and larger particles |
| Air Flow Head Loss | Less than 3.175 mmHg @ 0.21 m$^3$/min |
| Size | Fit conveniently under chair toe or in sink cabinet |
| Energy Requirements | No outside source, passive operation |
| Installation Ease | No special tools Splice into 5/8" hose between solids Separator and j-box |
| Shipping/ Handling | Self storing caps Water-tight, courier shippable |
| Operator interface | No tool switchover "Full" indicator Exchange for clean, empty replacement |
| Safety | Complies with OSHA Bloodborne Pathogen Standards |
| Environmental Hygiene | Exchange with EPA Certified contractor |

A primary purpose of the separation device and procedure of the invention is to capture hazardous waste material and provide for transporting the waste to an appropriate contractor, using a reusable or recyclable component that meets the standards established by OSHA, EPA, FDA, UPS, and Fed-Ex, and that can be shipped via parcel mail.

According to one aspect of the present invention there is provided a method of separating particles from at least one dental operatory effluent line, comprising: (a) Subjecting fluid including gas, liquid, and entrained particles, from a dental operatory to centrifugal separation so that at least the majority of the mass of the particles and liquid are discharged at a first location and the majority of the gas at a second location so that substantially effective separation of the particles from the gas occurs. (b) Filtering the liquid discharged at the first location to collect the majority of the particles therein. And, (c) disposing of the collected particles in an environmentally sound manner.

The method may further comprise (d) combining the filtered water from (b) with a gas flow from the second location. In a preferred embodiment (d) is practiced by causing the liquid to collect in a pool; passing a conduit containing the gas from the second location through the pool, and causing the liquid to selectively penetrate the conduit so as to be entrained by the gas. In a preferred embodiment, (a)–(d) are practiced by subjecting the fluid from the dental operatory to the force of a dental vacuum pump, which provides the motive force for effecting centrifugal separation and for passing the gas through the conduit.

According to the invention (a) may be practiced using a dental vacuum pump (already conventionally provided in association with a dental operatory) to provide the motive force for separation (acting with gravity to effect separation). For example (a) may be practiced using gravity and the dental vacuum pump as substantially the only motive forces for effecting separation.

The invention can be cost-effective and not only practical in a situation where (a)–(c) are practiced using a fluid stream solely from a single dental operatory. Also preferably (a)–(c) are practiced so as to separate and dispose of at least about 95% of the particles in the fluid having a dimension of 4 microns or more, and typically (a)–(c) are practiced with an air flow head loss of less than 0.125 inches mercy at about 0.21 cubic meters/min.

In the preferred embodiment of the invention (a) is practiced by subjecting the fluid to a plurality of parallel centrifugal separation operations, and combining the filtered liquid and second location gas from the plurality of separation operations.

According to another aspect of the present invention there is provided a particle-containing fluid handling system, comprising: A housing having a particle-containing fluid inlet, and at least one outlet. A plurality of parallel centrifugal separators mounted in the housing each including a tangential inlet, a bottom outlet, and a top outlet. A common discharge conduit connected to the top outlets and the at least one housing outlet. The housing fluid inlet connected to the separator tangential inlets. And, a particle filter mounted in the housing below the separator outlets.

In a preferred embodiment of the invention, the at least one housing outlet is connected to a dental vacuum pump and the housing inlet is connected to a single dental operatory. The system preferably further comprises a liquid collecting tray disposed below the filter which collects and directs liquid that has passed through the filter. For example the at least one housing outlet consists essentially of a single housing outlet; and the liquid collecting tray causes a pool of liquid to form adjacent to where the conduit connects to or forms the housing outlet, and the system further comprises an opening in a bottom portion of the conduit at the pool which allows liquid from the pool to pass through the opening into the conduit to be entrained by gas flowing in the conduit.

The particle filter may comprise a polypropylene mesh filter certified to remove 5 micron particles, or may comprise another conventional filter which can effectively remove at least about 95% of particles over a certain size (e.g. a maximum dimension of 4 or 5 microns). Preferably the housing is dimensioned to fit within a dental office chair toe or in a dental office sink cabinet.

The plurality of centrifugal separators may consist essentially of two separators, but preferably consists essentially of four parallel centrifugal separators. Parallel centrifugal separators are used so as to reduce the size of any separator that is necessary to effectively achieve the desired separation efficiency. The filter may be mounted in a frame, and the frame may include an opening therein, with a portion of the conduit passing through the opening and held in position thereby.

According to yet another aspect of the present invention there is provided a particle-containing fluid handling system comprising: A plurality of parallel centrifugal separators each having a tangential inlet, a top outlet; and a bottom outlet. The tangential inlets operatively connected to a particle-containing fluid line from a single dental operatory and the top outlets connected to a dental vacuum pump. And, a particle filter operatively connected to the bottom outlets from the separators. In this embodiment the plurality of centrifugal separators typically consists essentially of two centrifugal separators, and the particle filter is typically in a separate housing below the separators.

It is the primary object of the present invention to efficiently and cost effectively remove particles from a particle-containing fluid stream from a dental operatory. This and other objects of the invention will become clear from an inspection of the detailed description of the invention and from the appended claims.

DETAILED DESCRIPTION OF THE DRAWINGS

Figure 12:
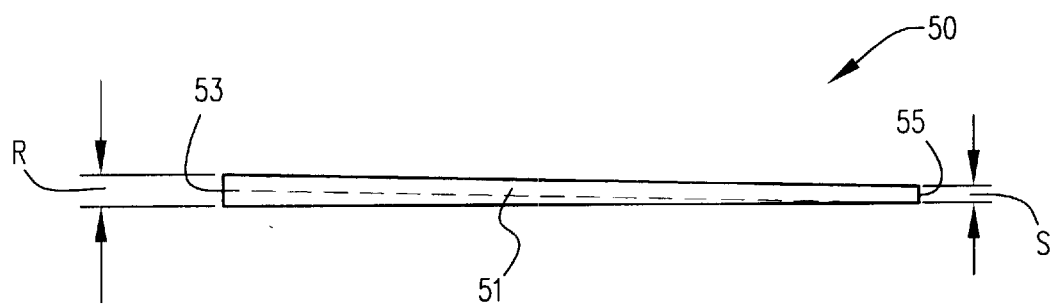
FIGS. 12 and 13 are side and top perspective views of the bottom piece/trough of the assembly of the FIGS. 1 through 11.
Figure 13:
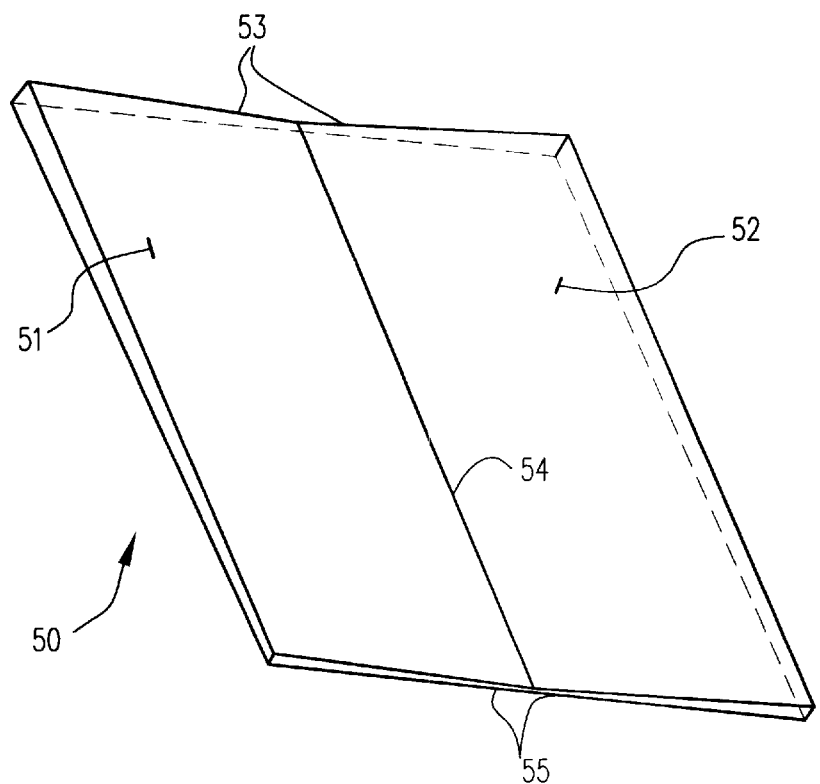
Figure 14:
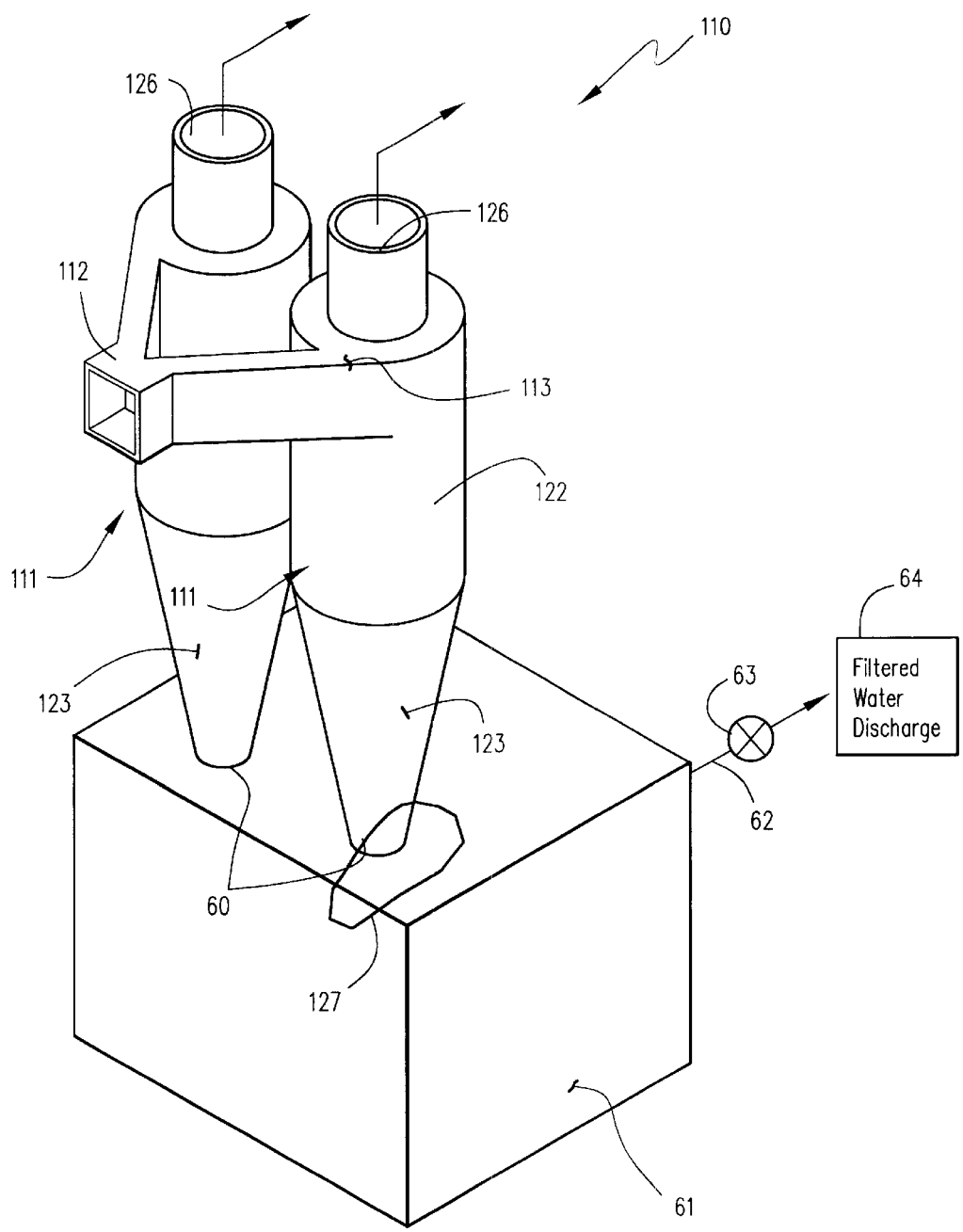
FIG. 14 is a top isometric view of another embodiment of an amalgam separator assembly according to the present invention.

One embodiment according to the invention is illustrated in assembly form in FIGS. 1 through 4, with various detailed illustrations of components thereof illustrated in FIGS. 5 through 13, and another embodiment in FIG. 14.

A basic assembly is illustrated schematically and generally by reference numeral 10 in FIGS. 1 through 4 and includes one or a plurality of in parallel cyclone separators 11, and inlet conduit 12, a header 13 for distributing the fluid flowing in the inlet conduit 12 to each of the cyclone separators 11, an outlet header 14 from the tops of the cyclone separators 11, and a conduit 15 leading fluid (primarily gas) from which particles have been removed outside of the common housing 16, through the outlet conduit 17. The common housing 16 mounts not only the separators 11 and the associated components as described above, but also can be used to mount a collector, receiver, or trap for the particles separated by the separators 11.

Figure 1:
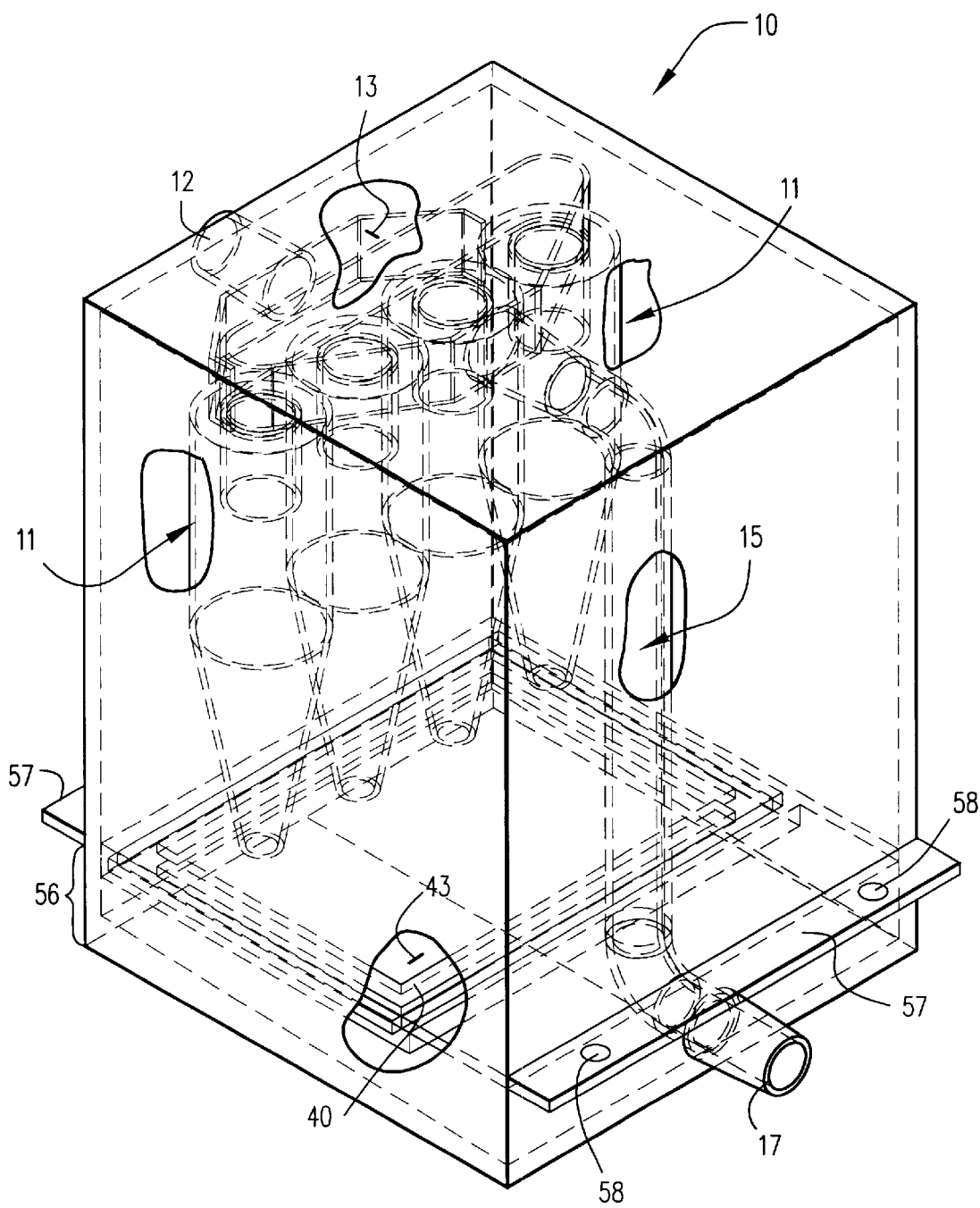
FIG. 1 is a top isometric view of one embodiment of an assembly according to the invention.
Figure 2:
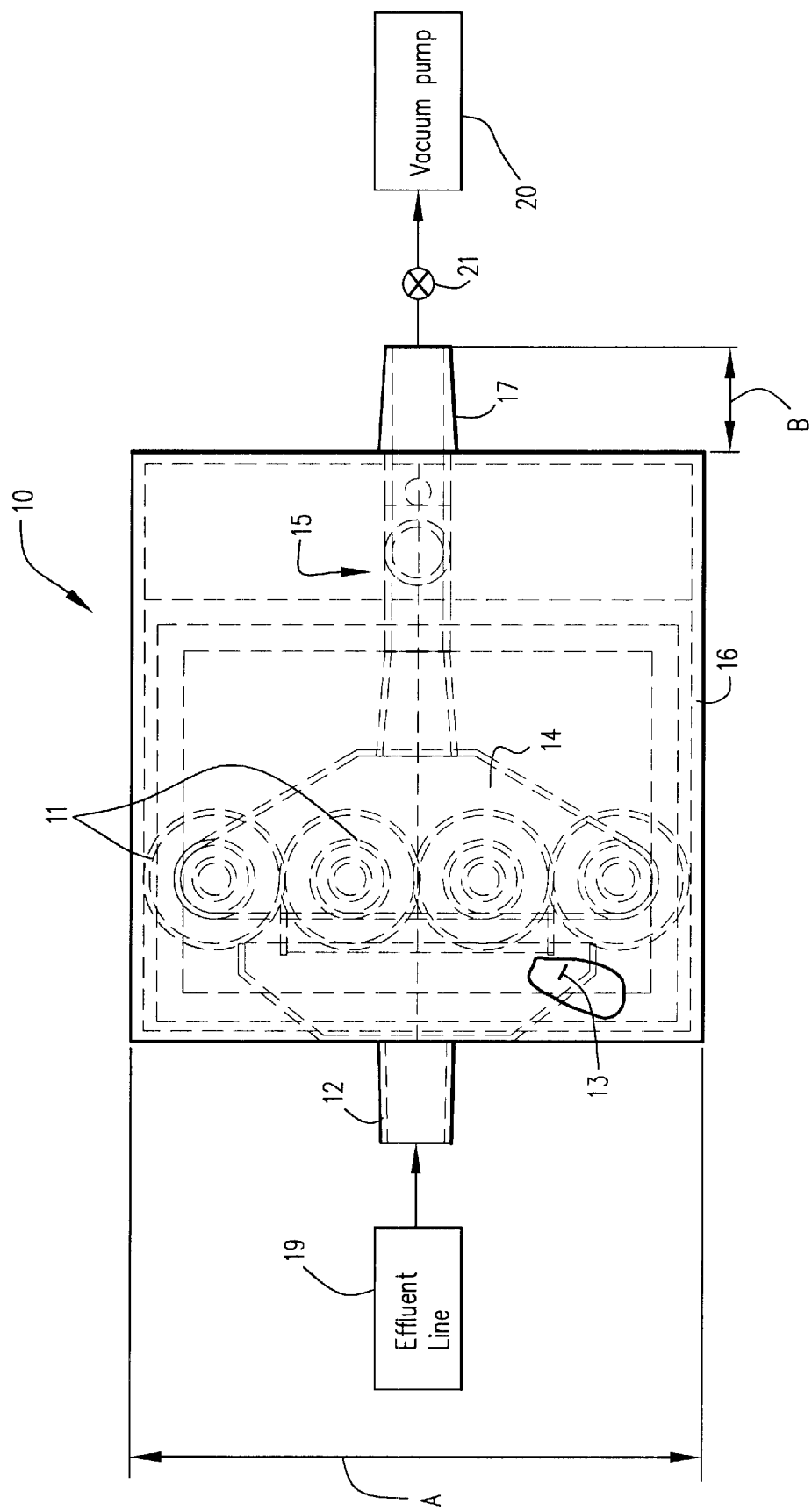
FIGS. 2, 3, and 4 are top, front, and side views of the assembly of FIG. 1, respectively.

The inlet 12 (see the schematic illustration in FIGS. 2 and 4) is connected up to an effluent line 19 preferably from a single dental operatory, although it can be connected to a plurality of operatories if desired, and if the assembly 10 is designed with sufficient capacity. An outlet 17 is connected to the conventional dental vacuum pump 20 (seen schematically in FIGS. 2 and 4), such as shown in U.S. Pat. Nos. 5,282,744 and 4,963,094 (the disclosures of which are hereby incorporated by reference herein). As seen in FIG. 2, a conventional adjustable valve 21 (manual or automatic) may be provided in the conduit leading to the vacuum pump 20 if desired. The vacuum pump 20 typically will serve a number of units 10, each being connected thereto via a header, branch lines, or the like.

Figure 4:
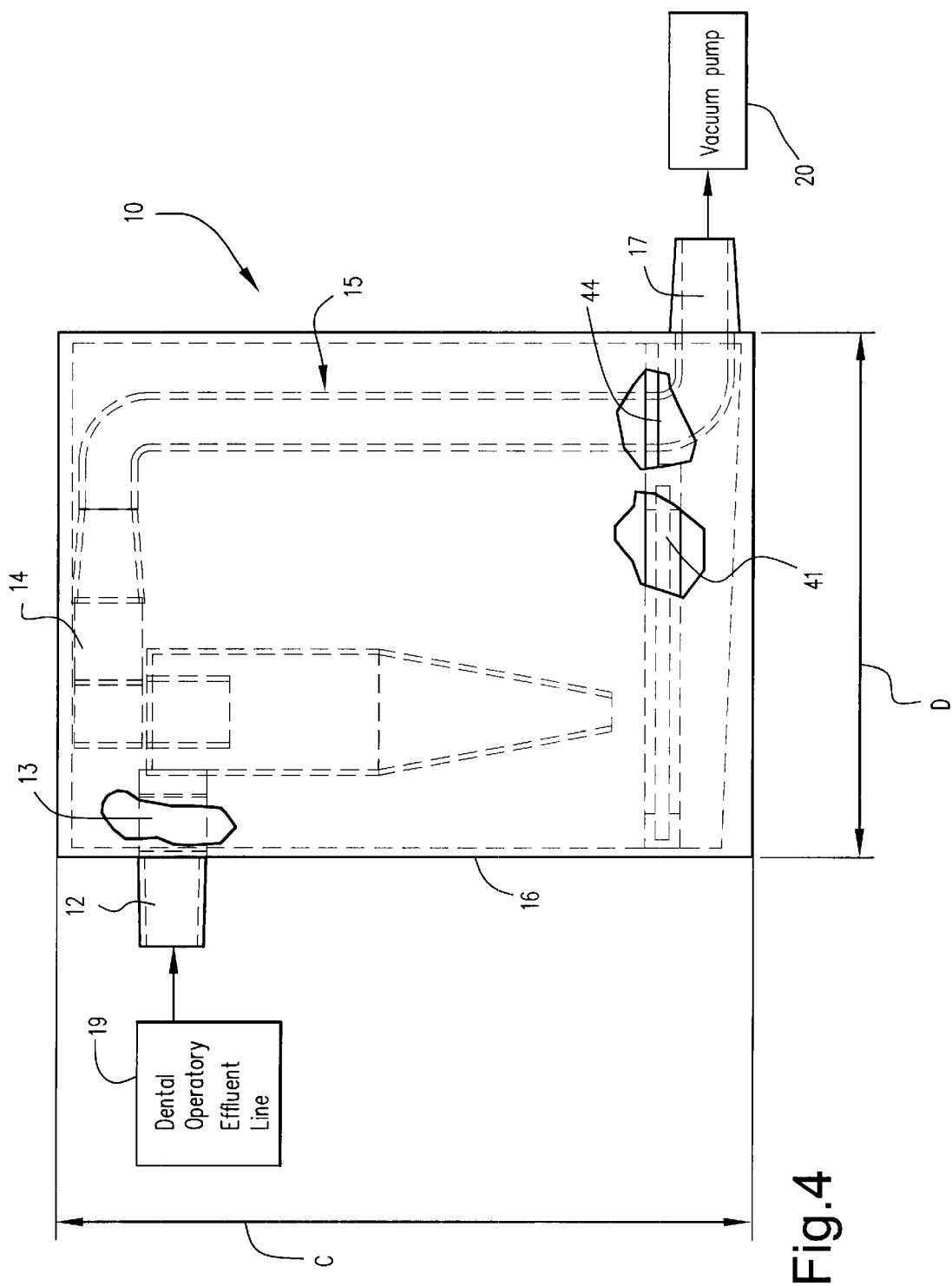
Figure 5:
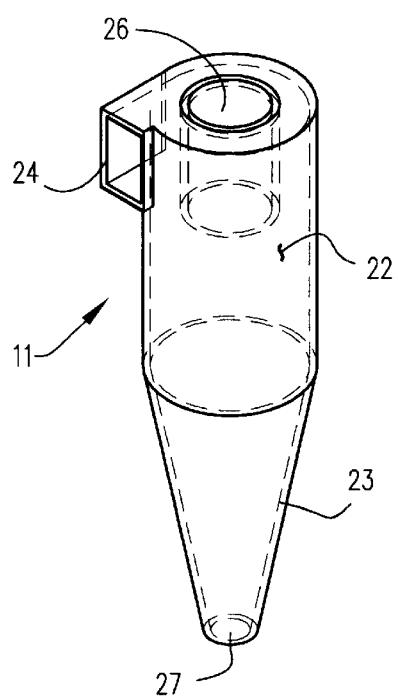
FIG. 5 is a top isometric view of one of the centrifugal separators of the assembly of FIGS. 1 through 4.
Figure 6:
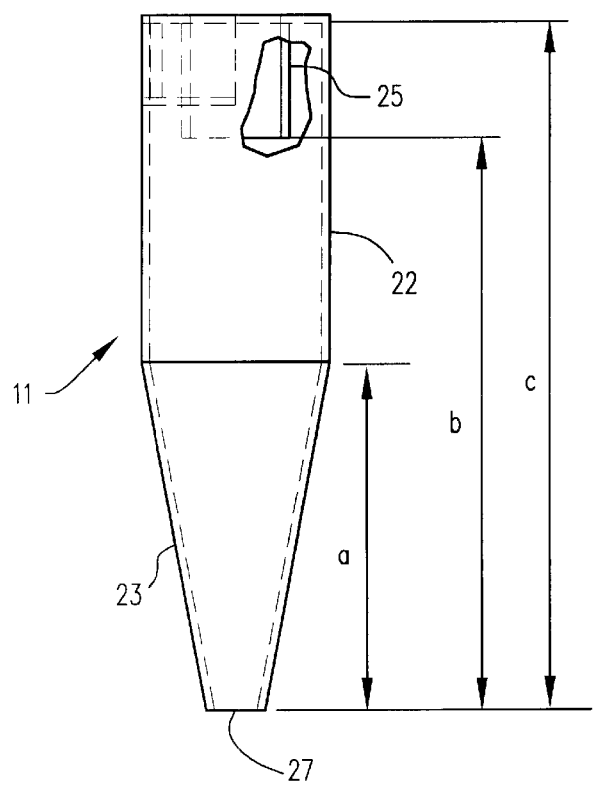
FIGS. 6, 7, and 8 are side, front primarily cross-sectional, and top views, respectively, of the cyclone separator of FIG. 5.
Figure 7:
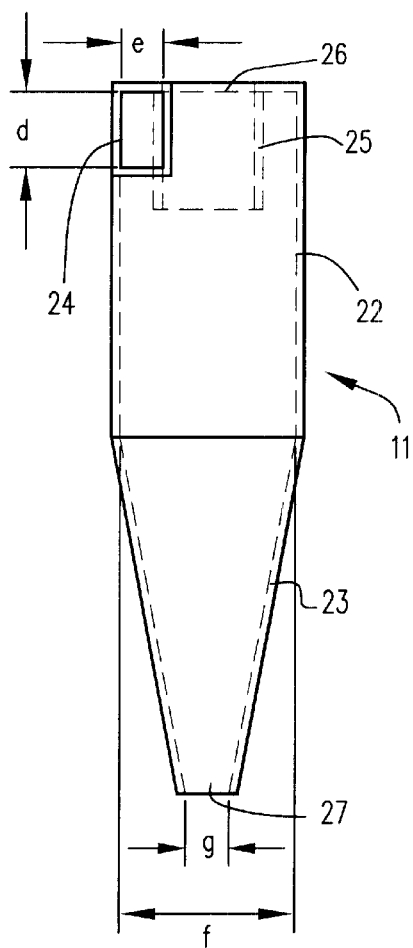
Figure 8:
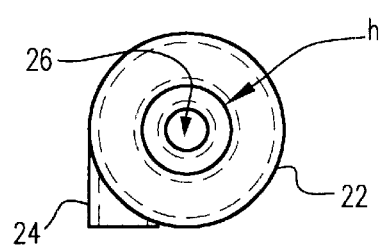

FIGS. 5 through 8 show the details of each of the cyclone separators 11, and FIGS. 6 through 8 also show preferred dimensions thereof when four cyclone separators 11 are utilized in the assembly 10 and when the assembly 10 is dimensioned to fit conveniently under a chair toe or in a sink cabinet, and can remove at least about 95% of particles 5 microns and larger, with an air flow head loss of less than about 3.2 mm of mercury at about 0.2 cubic meters per minute flow. The dimensions of the housing 16 that may be provided to achieve this objective (see FIGS. 2 and 4) are about A=5.5 inches, B=1 inch; C=7.375 inches, and D=6 inches.

The centrifugal separator 11 has a cylindrical body wall 22 at the top portion thereof, and an inwardly tapering conical wall 23 at the bottom, with an inlet 24 (connected to the header 13 ), and a vortex separator 25, which comprises a tube extending downwardly from the top of the separator 11 and having an outlet for primarily gas as indicated by reference numeral 26 in FIGS. 5, 7 and 8. Particle (and liquid) discharge outlet 27 is at the bottom of the conical wall 23. When four cyclones 11 are utilized, they each have a diameter of about 3.175 cm (about 1.25 inches) and a length of about 12.7 cm (about 5 inches). Other approximate dimensions for the embodiment illustrated in FIGS. 6 through 8 may be a=2.494 inches, b=4.219 inches, c=5.0 inches, d=0.625 inches, e=0.313 inches, f=1.25 inches, g=0.313 inches, and h=0.625 inches.

Each cyclone 11 utilizes centrifugal forces and particle inertia to accomplish separation. The particle-entrained fluid is introduced tangentially through inlet 24 to the cyclone cylindrical wall 11 and forced into a circular path. When introduced with a sufficient velocity, the fluid is incapable of exerting centrifugal forces large enough to retain the heavy particles in its path. The solids and liquid then migrate to the outer cyclone wall 22, get caught in a low velocity region, and settle out through conical portion 23 the solids/liquids discharge port 27. The gas spirals through a vortex in the center and is discharged through vortex separator 25 and outlet 26 in the top of cyclone 11. Thus, the major design factors influencing cyclone separation performance are the fluid inlet velocity, particle/droplet size and density, gas density and viscosity, and cyclone diameter.

Figure 9:
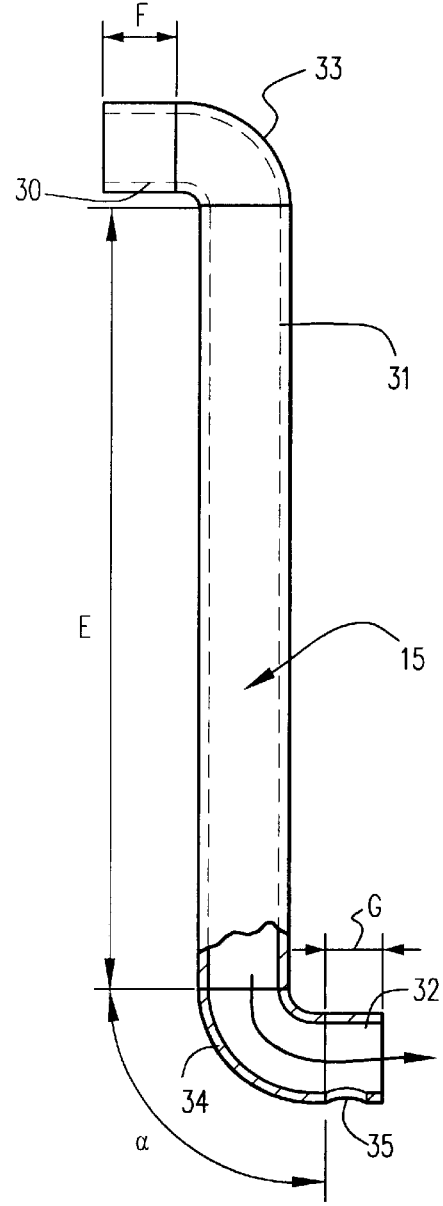
FIG. 9 is a side view, partly in cross section and partly in elevation, of the conduit connecting the cyclone discharges from the assembly of FIGS. 1 through 4 to a vacuum pump.

The conduit 15 (see FIG. 9 in particular) has an inlet 30, main tubular body 31, outlet 32, and curved transitions 33, 34 between the main body 31 and the inlet 30 and outlet 32, respectively. In the lower portion of the outlet 32, preferably centrally located, is an opening 35 through which filtered liquid can flow upwardly into the outlet 32, to be carried away by passage through the outlet 17 into the vacuum pump 20. Exemplary dimensions that may be used for the conduit 15 in FIG. 9 are about E=5.375 inches, F=0.559 inches, G=0.375 inches, and $\alpha=90°$.

The collecting unit 40 is shown in the FIGS. 1 through 4 embodiments as mounted in the same housing 16 as the cyclone separators 11. However, it can be mounted in a separate housing, with the particle outlet 27 from each cyclone separator 11 connected to a separate collecting unit.

Figure 10:
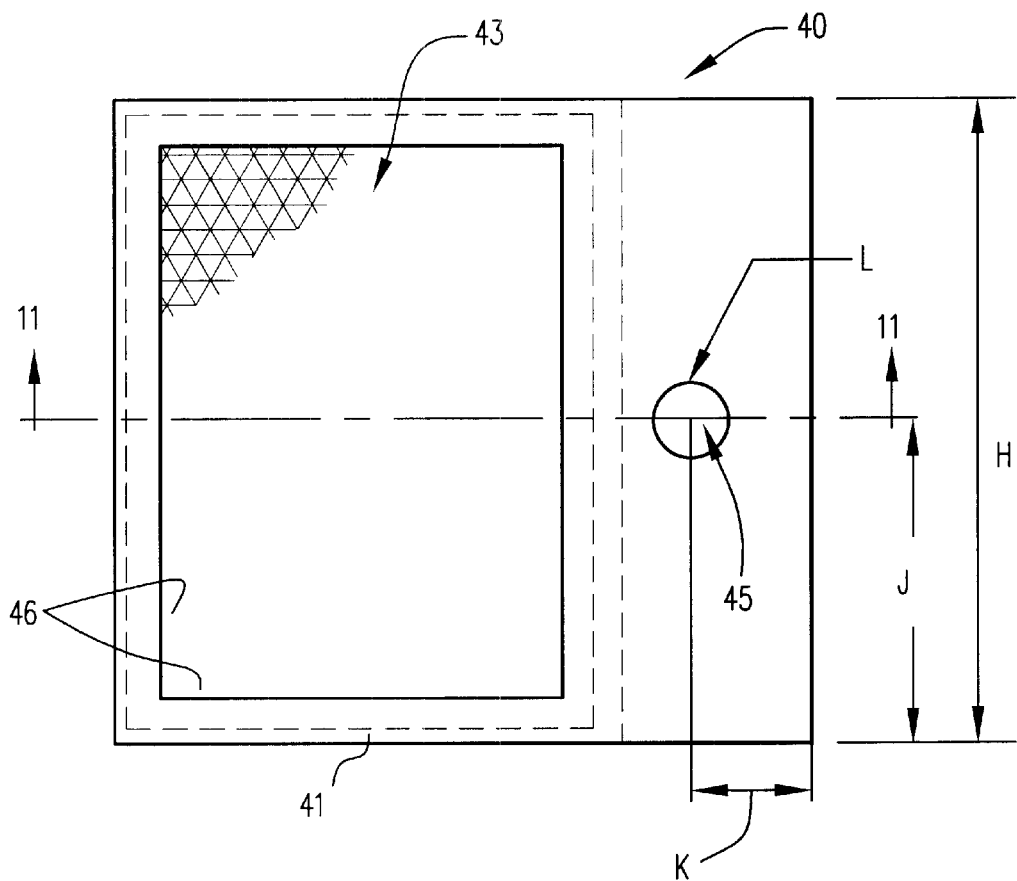
FIG. 10 is a top plan view of the filter construction used in the assembly of FIGS. 1 through 4.
Figure 11:
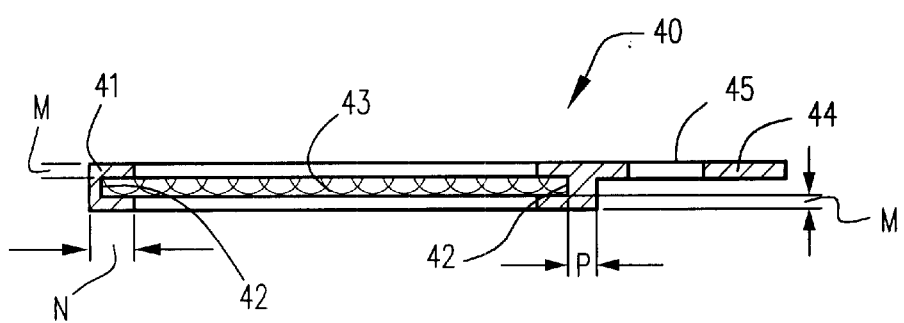
FIG. 11 is a cross-sectional view, taken along lines 11—11 of FIG. 10, of the filter construction of FIG. 10.

The collecting unit 40 according to the embodiment of FIGS. 1 through 4 is illustrated in more details in FIGS. 10 and 11. It includes a frame 41 preferably having an interior channel 42 extending around the inner circumference thereof, defining an opening 46, and mounting a filter element 43 therein, as seen most clearly in FIGS. 10 and 11. The filter element 43 may be any suitable conventional filter element which is capable of separating out and retaining five micron (or larger ) particles. The filter material 43 must have sufficient flow capacity to handle the rinsing of the vacuum lines at the end of the day in a conventional dental operatory (that is approximately a flow capacity of 0.7 liters per minute), and preferably has a high collection capacity so that it will hold a maximum number of separator particles (typically amalgam particles, but other sludge also being separated) so that the filter element need be changed as infrequently as possible. For example, one filter material 43 that can be utilized is a polypropylene mesh filter made by Hayward American Felt and Fiber Products, which is certified by the FDA to remove 5 micron particles.

Figure 3:
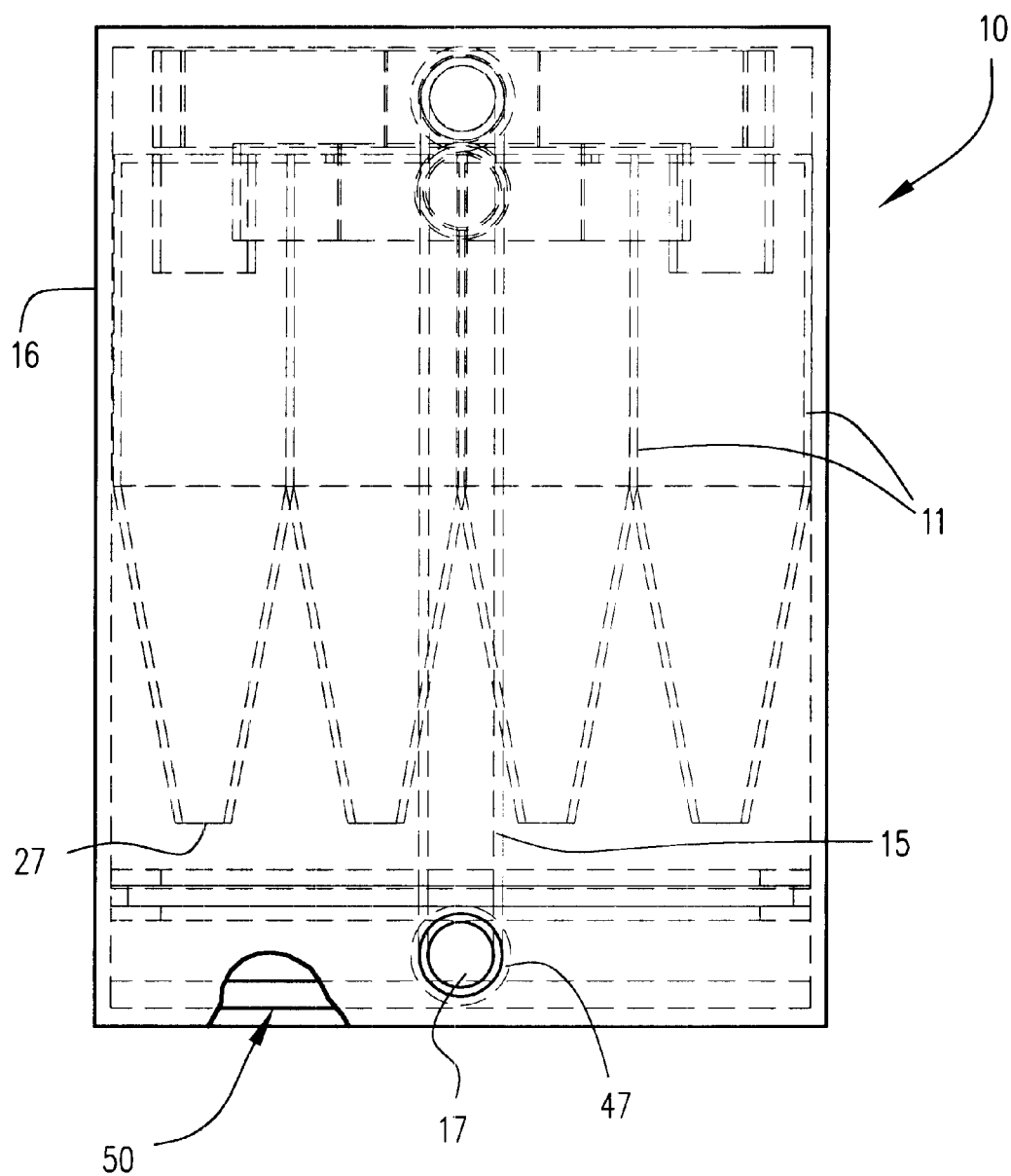

The collector 40, as seen in FIGS. 4, 10, and 11, also preferably has a mounting flange 44 extending outwardly therefrom toward the wall of the housing 16 through which the conduit discharge 32 passes, the flange 44 having an opening 45 therein dimensioned to receive the tubular body 31 of the conduit 15 therein. The elbow 34 and the outlet 32 may be releasably attached to the bottom of the conduit body 31, or ultrasonically welded together after the conduit body 31 passes through the opening 45. The opening 45 is positioned so as to effectively mount the conduit 15 so that it aligns with an opening 47 in the front wall of the housing 16, as illustrated in FIG. 3, with the conduit 17 extending outwardly therefrom. Exemplary dimensions that the structures illustrated in FIGS. 10 and 11 could have are about H=5.5 inches, J=2.75 inches, K=0.875 inches; L=a diameter of 0.5 inches, M=0.125 inches, N=0.5 inches, and P=0.25 inches.

During operation of the assembly 10, separated particles and liquid (such as amalgam and other sludge particles) pass through the outlet 27 into contact with the filter material 43, the particles 5 micron in size or larger being separated out, while the liquid (primarily water) which has been filtered, passes through the bottom of the filter material 43 and preferably is collected and directed by the bottom directing trough shown generally by reference numeral 50 in FIGS. 3, 12 and 13. The structure 50 may comprise a pair of mirror image floor elements 51, 52 having one relatively high end 53, with a central trough portion 54, leading to a small height end 55. This causes the filtered water to flow toward the ends 55 and collect in the center trough 54. The opening 35 in the outlet 32 of the conduit 15 is disposed just above the trough portion 54 adjacent the ends 55 of the floor elements 51, 52 so that as the liquid level builds up the filtered liquid flows through the opening 35 into the outlet 32, and is carried away to the vacuum pump 20. Exemplary dimensions for the tray 50 (see FIG. 12) may be R=0.25 inches and S=0.125 inches.

A conventional sensor may be provided for sensing when the filter 43 is "full".

The assembly 10 is capable of separating at least 95% of the amalgam, and other sludge particles, 5 micron in size or larger from the effluent line 19 connected to a dental operatory, and in fact can exceed 98%, or even 99%, separation efficiency.

Periodically the filter element 43 needs to be changed. This can be accomplished, for example, by—as illustrated schematically in FIG. 1—mounting the bottom section 56 of the housing 16 so that it is removable from the rest of the housing 16, such as by providing flanges 57 extending outwardly from both the bottom section 56 and the rest of the housing 16, and connected together by releasable fasteners, such as shown schematically at 58 in FIG. 1. The connection between the elbow 34 and the body 31 is also removable in these circumstances, and if desired a seal (such as by an O-ring, or other elastomeric material) may be provided where the bottom housing 56 engages the rest of the housing 16. Any other suitable structure facilitating the removal of the filter material 43 may also or alternatively be provided, such as a sealed doorway that opens up and allows the unit 40 to slide out of the housing 16 (after disconnection of the body 31 at the opening 45 ), or any other suitable conventional structure. The filter material 43 is then easily either cleaned or replaced, and the unit 40 returned to the position illustrated in FIGS. 1 through 4.

FIG. 14 illustrates a two cyclone embodiment of an assembly 110 according to the invention. In FIG. 14 components comparable to those shown in FIGS. 1 through 8 are shown by the same reference numeral only preceded by a "1".

The assembly 110 is based upon the calculation that a cyclone separator of a diameter of about 6.35 cm (about 2.5 inches) and a length of about 15 cm will separate amalgam particles four microns in diameter with an efficiency of about 95%. To further reduce size and increase efficiency the single cyclone separator is provided as two half-capacity cyclones 111 operating in parallel (just as the cyclones 11 operate in parallel with each other), as illustrated in FIG. 14. Exemplary dimensions of the receiver 61, which is connected by openings 60 to a bottom outlet 127 of each of the cyclones 111, a length of about 20 centimeters, a width of about 12 centimeters, and a height of about 10 centimeters. The receiver 61 is thus a separate unit than the cyclones 111, and may have any other suitable filtering or other particle holding material therein, with the filtered water being discharged through line 62, and optionally through valve 63 to some filtered water discharge 64 either for sewering or for reuse (e.g. in the vacuum system along with the vacuum pump, such as the pump 20 in FIGS. 2 and 4).

Figure 15:
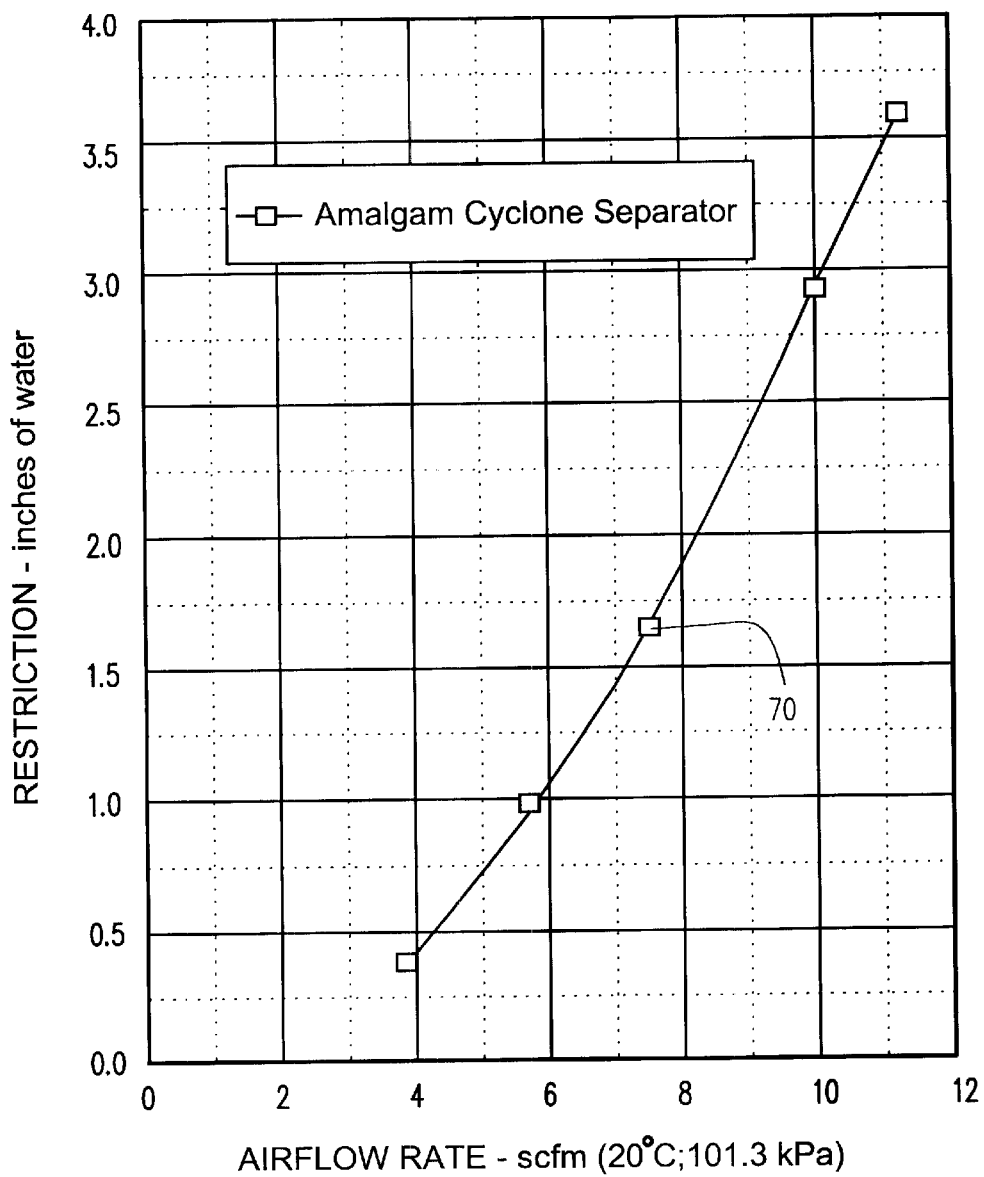
FIG. 15 is a graphical representation of restriction versus air flow for the separator of FIG. 14.

FIG. 15 illustrates the operation of the cyclones 111 of FIG. 14, comparing restriction in inches of water with the air flow rate at room temperature and pressure. The data point 70 is the design flow rate for the assembly 110, it is about 7.5 scfm.

In the description above, while various dimensions are given it is to be understood that the dimensions may change depending upon how many operatories that are associated with a particular unit, and other factors. All dimensions given above should be considered to be within the range of ±10%, and all narrower ranges within each broad range. Those designed dimensions give optimum efficiency and functionality, but where optimum efficiency is not necessary dimensions may be significantly departed from.

Thus, according to the invention there is provided at least one centrifugal separator (preferably a plurality of separators) operatively connected to at least one dental operatory (preferably only a single dental operatory) discharge and to one or more vacuum pumps. Where a plurality of separators are provided, typically two or four separators are provided (although other numbers may be provided) in parallel, and connected by a header to the at least one operatory effluent line, and having the gas discharge openings thereof connected by another header to a gas discharge conduit. The particles/liquid discharged from the bottom of the separator(s) may be directed substantially immediately onto a filtering material which filters out amalgam and other particles, for example particles having a particle size of either four or five microns, or larger, although other sizes may be used as subsequent regulations may require. The filtered water may be used to rejoin the gas conduit for connection to the vacuum pump where the cyclone separator (s) and filter material are mounted in the same housing.

The invention also relates to a method of removing amalgam and like particles from a dental operatory effluent line (preferably connected to only one operatory, but possibly to a plurality of, operatories) to remove about 95%–100% of the either four or five micron or larger particles by centrifugal separation; collecting the particles; disposing of the particles in an environmentally sound manner (such as recycling, and/or chemical reaction to render inert and then landfilling, or any other suitable conventional manner, after they are captured by a filter material); and returning the gas flow from the effluent line to the dental vacuum pump. The filtered liquid which contains particles smaller than 4–5 microns may also be returned to the vacuum pump. The method is accomplished with an air flow head loss of less than 3.175 mm (0.125 inches) mercury at about 0.21 cubic meters per minute. The separation and collecting procedure and device preferably use no external power source and are reliable, and effective, and take up a minimum of space.

That is according to the invention a method of separating particles from at least one (and preferably only one) dental operatory and fluid line is provided comprising: (a) Subjecting fluid (in effluent line 19) including gas, liquid, and entrained particles from a dental operatory to centrifugal separation (in the separators 11) so that at least the majority of the mass of the particles in liquid are discharged at a first location (the open bottoms of the separators 11) and the majority of the gas at a second location (the top outlets 26) so that substantially effective separation of the particles from the gas occurs. (b) Filtering (by gravity flow through the filter element 43) the liquid discharged at the first location to collect a majority of the particles therein. And, (c) disposing of the collected particles in an environmentally sound manner (e.g. by transporting the filter 43 to be treated to recycle the particles, particularly the amalgam particles, and/or to chemically react the particles with other substances to render them inert for easy landfill disposal, or in other conventional manners). The method also typically comprises (d) combining the filtered water from (b) with a gas flow from the second location, for example by causing the liquid to collect in a pool (guided by tray 50), causing the conduit (the conduit 15) to pass through the pool, and causing the liquid to selectively penetrate the conduit so as to be entrained by the gas (that is the liquid flowing up through the opening 35 in FIG. 9 so as to be entrained by gas flowing through the conduit 15).

Preferably (a)–(d) are practiced by subjecting the fluid from the dental operatory to the force of the dental vacuum pump 20, the dental vacuum pump, and gravity, being substantially the only motive forces for effecting the separation, no accessory energy source being necessary. The method achieves at least about 95% collection and disposal of the particles in the fluid line 19 having a maximum dimension of 4 microns or more, and the method can be practiced with an air flow head loss of less than 0.125 inches mercury at about 0.2 cubic meters per minute (and comparable head losses at other flow rates).

The invention also specifically includes all narrower ranges within any broad range.

The invention is to be accorded the broadest interpretation possible limited only by the prior art so as to encompass all equivalent methods and systems.

What is claimed is:

1. A method of separating particles from at least one dental operatory effluent line, comprising:

(a) subjecting fluid including gas, liquid, and entrained particles, from a dental operatory to centrifugal separation so that at least the majority of the mass of the particles and liquid are discharged at a first location and the majority of the gas at a second location so that substantially effective separation of the particles from the gas occurs;

(b) filtering the liquid discharged at the first location to collect the majority of the particles therein; and (c) disposing of the collected particles in an environmentally sound manner, wherein at least about 95% of the particles in the fluid are separated and disposed.

2. A method as recited in claim 1 further comprising (d) combining the filtered liquid from (b) with a gas flow from the second location.

3. A method as recited in claim 2 wherein (d) further comprises causing the liquid to collect in a pool; passing a conduit containing the gas from the second location through the pool, and causing the liquid to selectively penetrate the conduit so as to be entrained by the gas.

4. A method as recited in claim 3 further comprising subjecting the fluid from the dental operatory to the force of a dental vacuum pump, which provides the motive force for effecting centrifugal separation and for passing the gas through the conduit.

5. A method as recited in claim 1 wherein (a) comprises using a dental vacuum pump to provide the motive force for separation.

6. A method as recited in claim 5 wherein (a) comprises using gravity and the dental vacuum pump as substantially the only motive forces for effecting separation.

7. A method as recited in claim 1 further comprising using a fluid stream solely from a single dental operatory.

8. A method as recited in claim 1 wherein the particles are separated with an air flow head loss of less than 0.125 inches mercury at about 0.21 cubic meters/min.

9. A method as recited in claim 7 wherein (a) comprises subjecting the fluid to a plurality of parallel centrifugal separation operations, and combining the filtered liquid and second location gas from the plurality of separation operations.

10. A particle-containing fluid handling system, comprising:
   a housing having a particle-containing fluid inlet, and at least one outlet;
   a plurality of parallel centrifugal separators mounted in said housing each including a tangential inlet, a bottom outlet, and a top outlet;
   a common discharge conduit connected to said top outlets and said at least one housing outlet;
   said housing fluid inlet connected to said separator tangential inlets; and
   a particle filter mounted in said housing entirely below said separator outlets.

11. A system as recited in claim 10 wherein said at least one housing outlet is connected to a dental vacuum pump and wherein said housing inlet is connected to a single dental operatory.

12. A system as recited in claim 11 further comprising a liquid collecting tray disposed below said filter which collects and directs liquid that has passed through said filter.

13. A system as recited in claim 12 wherein said at least one housing outlet consists essentially of a single housing outlet; and wherein said liquid collecting tray causes a pool of liquid to form adjacent to where said conduit connects to or forms said housing outlet; and further comprising an opening in a bottom portion of said conduit at said pool which allows liquid from said pool to pass through said opening into said conduit to be entrained by gas flowing in said conduit.

14. A system as recited in claim 11 wherein said particle filter comprises a polypropylene mesh filter certified to remove 5 micron particles.

15. A system as recited in claim 11 wherein said housing is dimensioned to fit within a dental office chair toe or in a dental office sink cabinet.

16. A system as recited in claim 11 wherein said plurality of centrifugal separators consists essentially of four parallel centrifugal separators.

17. A system as recited in claim 11 wherein said filter is mounted in a frame; and wherein said frame includes an opening therein; and wherein a portion of said conduit passes through said opening, and held in position thereby.

18. A particle-containing fluid handling system comprising:
   a plurality of parallel centrifugal separators each having a tangential inlet, a top outlet; and a bottom outlet;
   said tangential inlets operatively connected to a particle-containing fluid line from a single dental operatory and said top outlets connected to a dental vacuum pump; and
   a particle filter operatively connected to said bottom outlets from said separators.

19. A system as recited in claim 18 wherein said plurality of centrifugal separators consists essentially of two centrifugal separators, and said particle filter is in a separate housing below said separators.

* * * * *